(12) United States Patent
Blanc

(10) Patent No.: US 12,234,103 B2
(45) Date of Patent: Feb. 25, 2025

(54) PROCESS AND SYSTEM FOR CONVEYING FRUIT AND VEGETABLES WITH AN ORIENTED STALK

(71) Applicant: MAF AGROBOTIC, Montauban (FR)

(72) Inventor: Philippe Blanc, Montauban (FR)

(73) Assignee: MAF AGROBOTIC, Montauban (FR)

( * ) Notice: Subject to any disclaimer, the term of this patent is extended or adjusted under 35 U.S.C. 154(b) by 551 days.

(21) Appl. No.: 17/620,638

(22) PCT Filed: Jun. 19, 2020

(86) PCT No.: PCT/EP2020/067122
§ 371 (c)(1),
(2) Date: Jun. 28, 2022

(87) PCT Pub. No.: WO2020/254589
PCT Pub. Date: Dec. 24, 2020

(65) Prior Publication Data
US 2022/0332518 A1     Oct. 20, 2022

(30) Foreign Application Priority Data

Jun. 19, 2019    (FR) ...................................... 19 06611

(51) Int. Cl.
*B65G 47/244*      (2006.01)
*B65G 17/24*      (2006.01)

(52) U.S. Cl.
CPC .......... *B65G 47/244* (2013.01); *B65G 17/24* (2013.01); *B65G 2201/0211* (2013.01); *B65G 2203/0225* (2013.01)

(58) Field of Classification Search
CPC ...... B65G 17/24; B65G 47/24; B65G 47/244; B65G 2201/0211; B65G 2203/0225;
(Continued)

(56) References Cited

U.S. PATENT DOCUMENTS

| 3,945,489 A | 3/1976 | Paddock et al. |
| 4,726,898 A * | 2/1988 | Mills ...................... B65G 47/24 |
| | | 209/939 |

(Continued)

FOREIGN PATENT DOCUMENTS

| JP | H09215963 | 8/1997 |
| JP | H09278158 | 10/1997 |

(Continued)

OTHER PUBLICATIONS

International Search Report Sep. 18, 2020.
International Preliminary Report dated Jan. 22, 2021.

*Primary Examiner* — Gene O Crawford
*Assistant Examiner* — Keith R Campbell
(74) *Attorney, Agent, or Firm* — Sofer & Haroun, LLP

(57) ABSTRACT

The invention concerns a method for transporting objects belonging to the group of fruits and vegetables with a stalk, characterized in that it comprises the following steps:
- conveying a plurality of objects (18) on a conveyor line (12) in a longitudinal forward direction (14), each conveyed object being carried by a support (16) that is moved by the conveyor line (12) according to its longitudinal forward movement,
- rotating at least one support (16) supporting an object (18) in such a way as to cause the object to rotate about a non-horizontal axis and give its stalk (18*a*) a predetermined geometric orientation.

13 Claims, 12 Drawing Sheets

(58) Field of Classification Search
CPC ........ A23N 2015/008; B07C 2501/009; G01N 2021/8466
See application file for complete search history.

(56) References Cited

U.S. PATENT DOCUMENTS

| | | | |
|---|---|---|---|
| 4,981,205 A * | 1/1991 | Cowlin | B65G 47/252 |
| | | | 198/387 |
| 5,078,258 A | 1/1992 | Vanderschoot | |
| 6,691,854 B1 | 2/2004 | De Greef | |
| 9,375,760 B2 | 6/2016 | Gual Pasalodos | |
| 9,475,643 B1 * | 10/2016 | Odman | B65G 39/20 |
| 9,670,006 B2 * | 6/2017 | Ruigrok | B65G 47/24 |
| 11,396,394 B2 * | 7/2022 | Blanc | B65B 35/58 |
| 2018/0020713 A1 * | 1/2018 | Schmilovitch | A23N 7/00 |
| | | | 99/538 |

FOREIGN PATENT DOCUMENTS

| | | |
|---|---|---|
| JP | H11116037 | 4/1999 |
| WO | 2017187076 | 11/2017 |

* cited by examiner

[Fig. 1B]
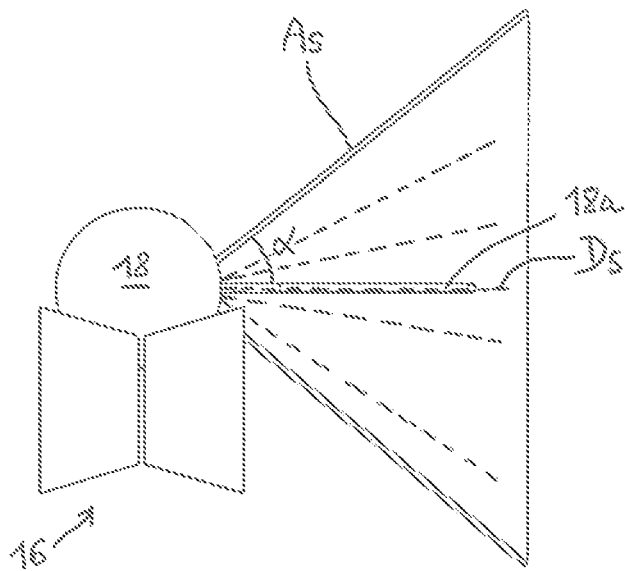
[Fig. 1C]
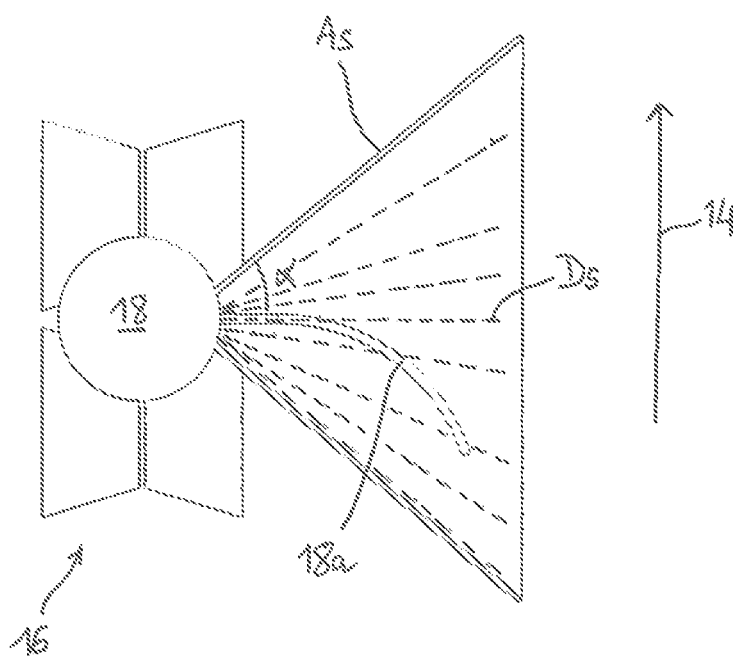

[Fig. 2]
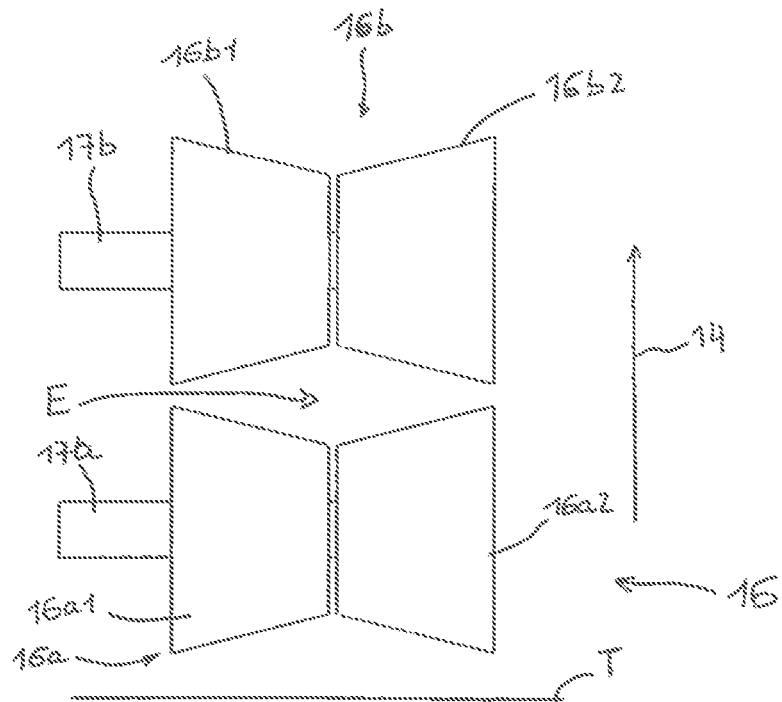
[Fig. 3]
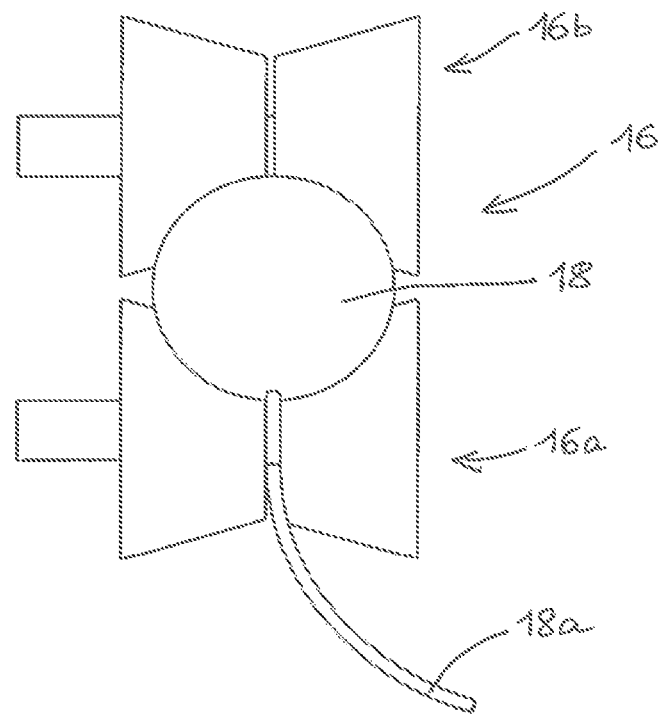

[Fig. 4]
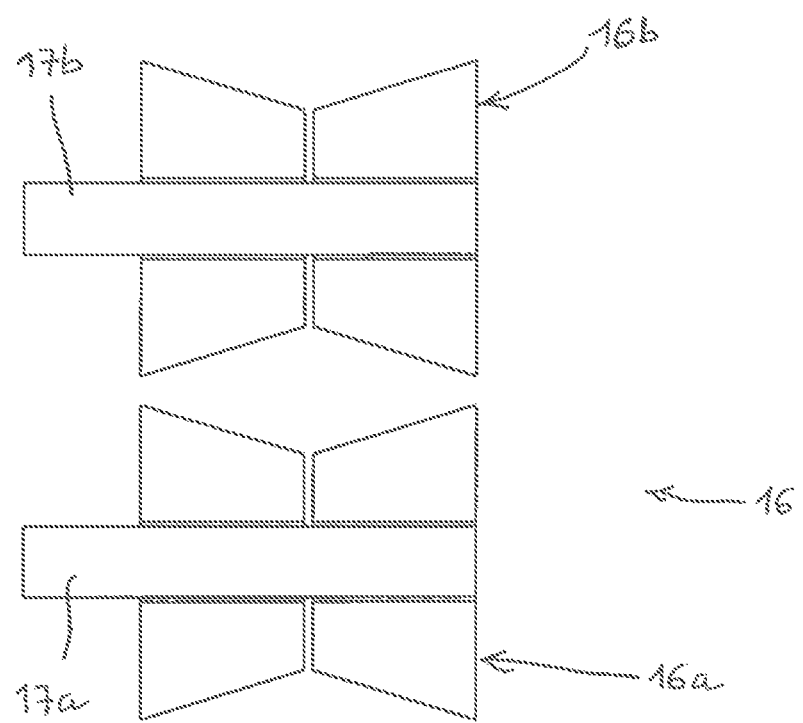

[Fig. 5]
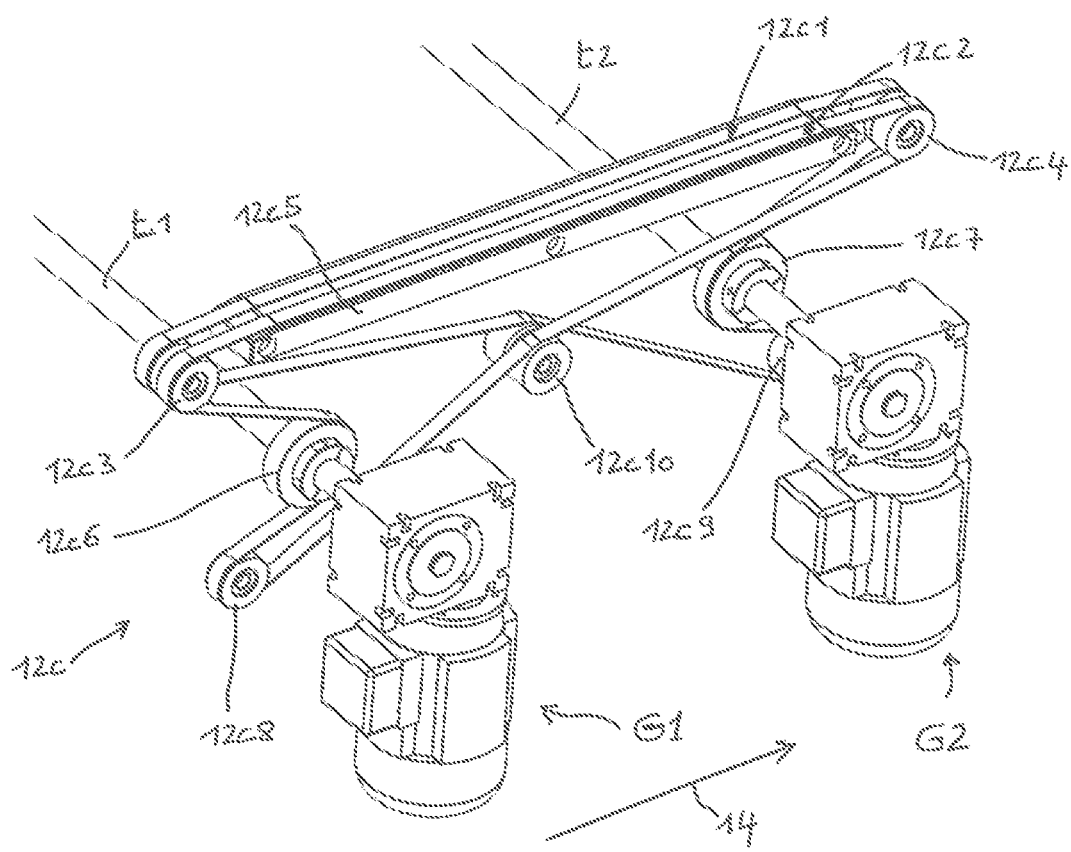

[Fig. 6]
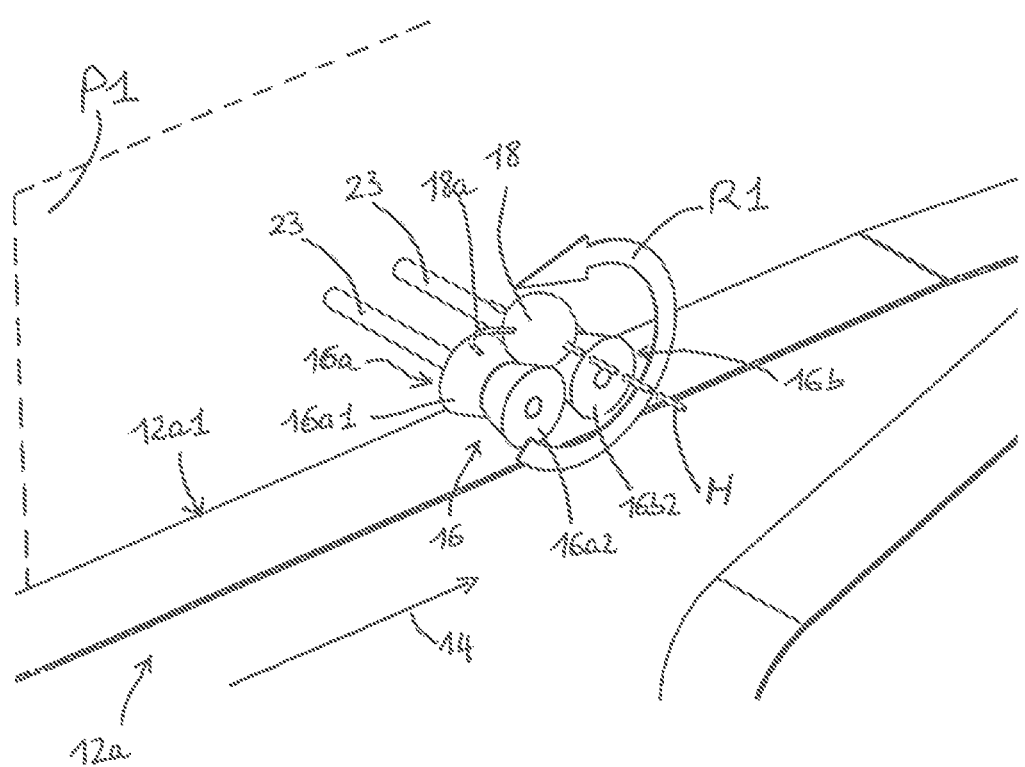

[Fig. 7]
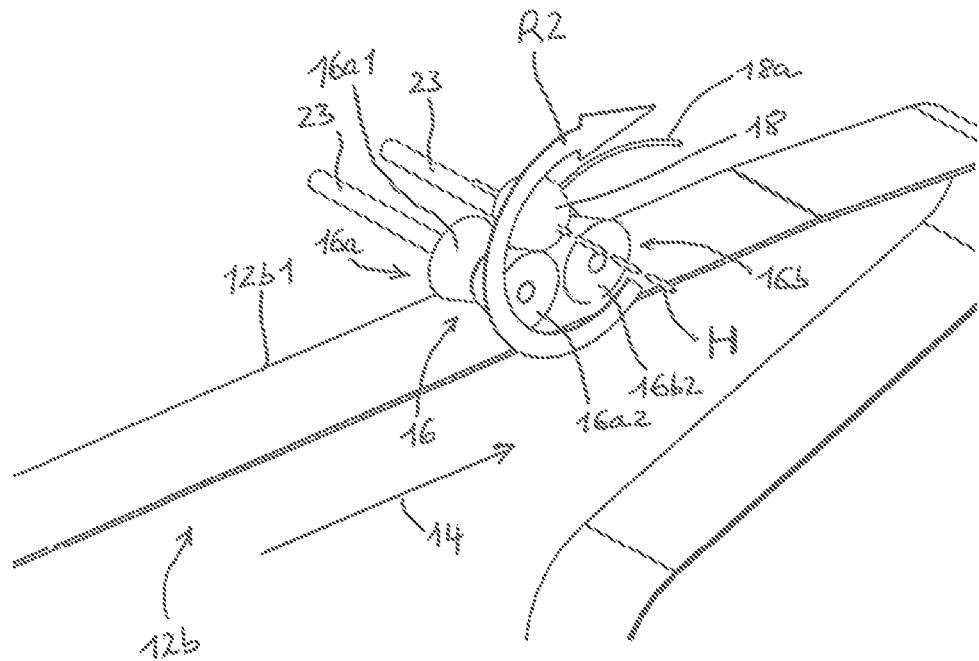
[Fig. 8A]
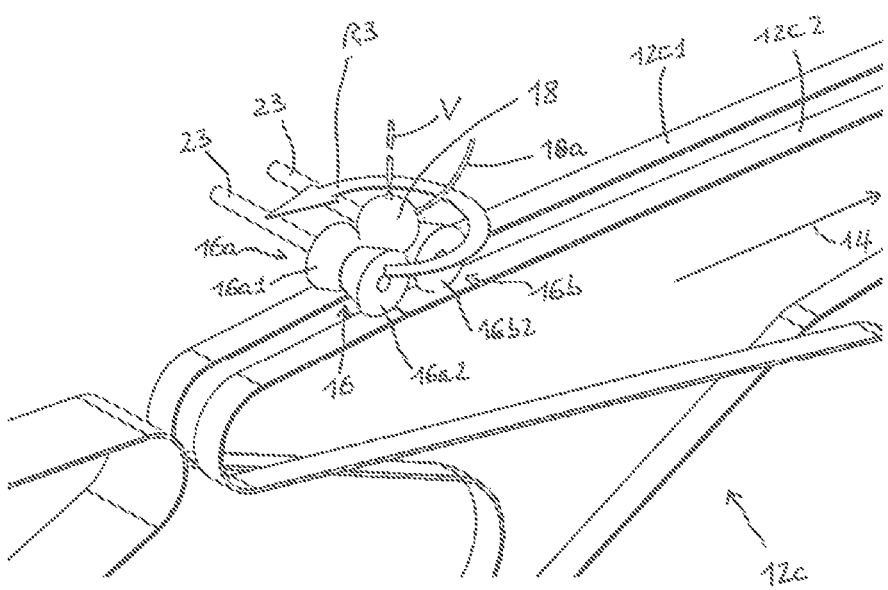

[Fig. 8B]
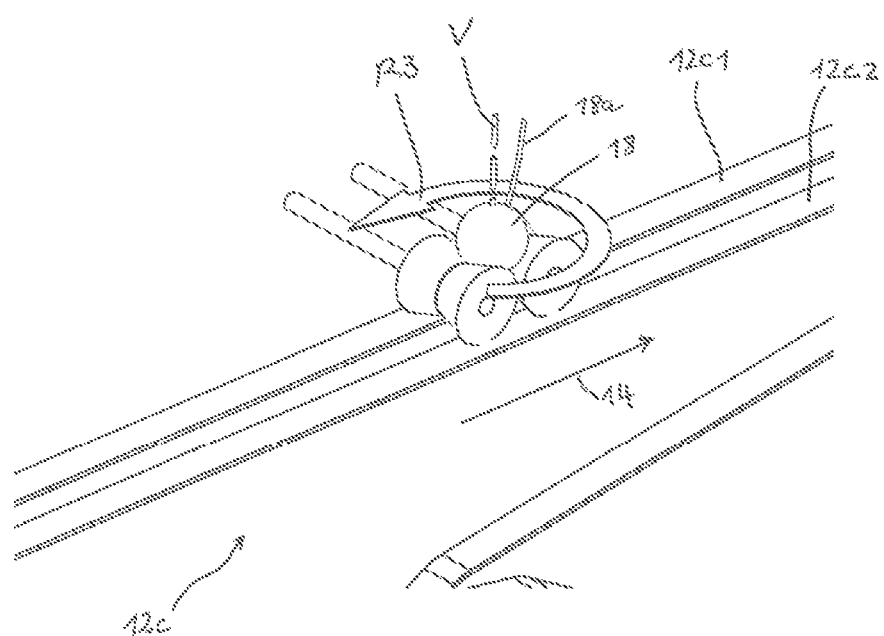

[Fig. 8C]
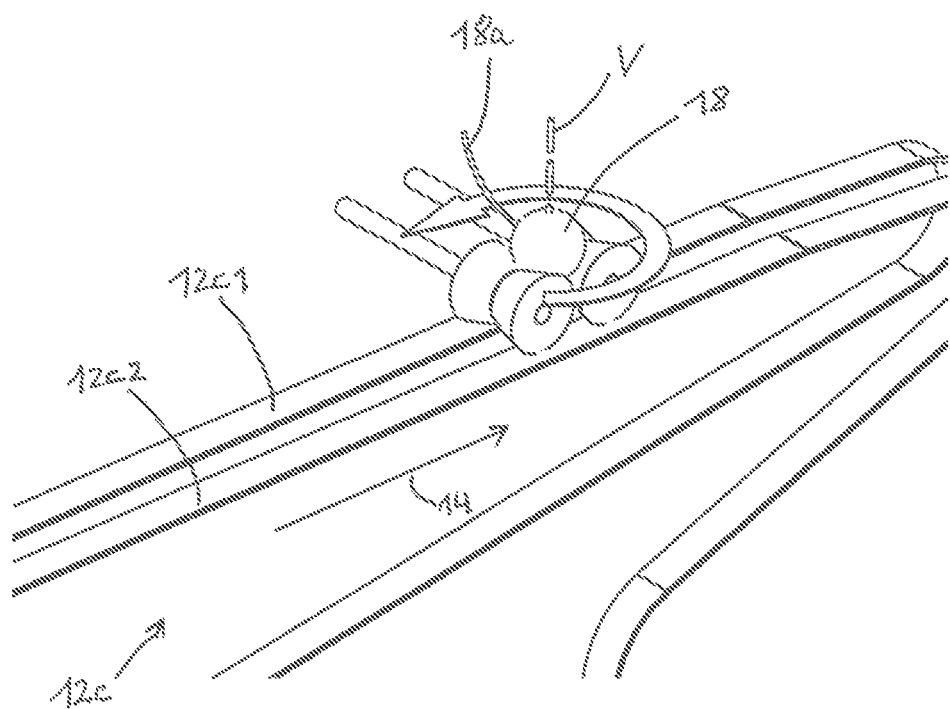

[Fig. 9A]
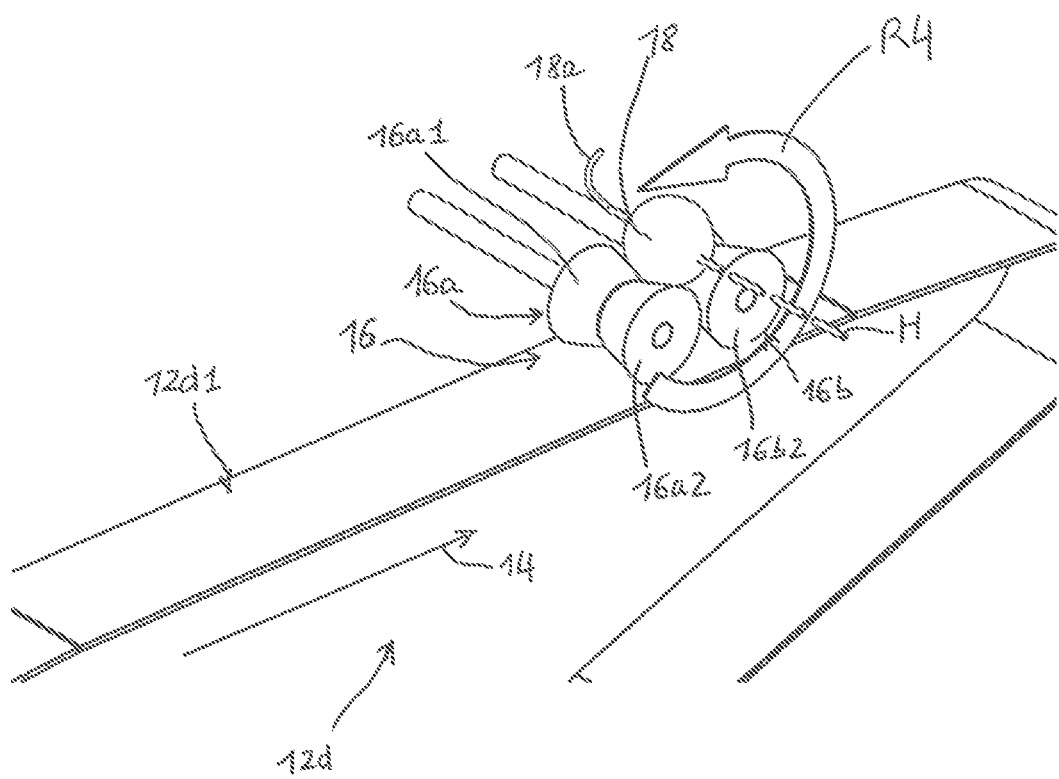

[Fig. 9B]
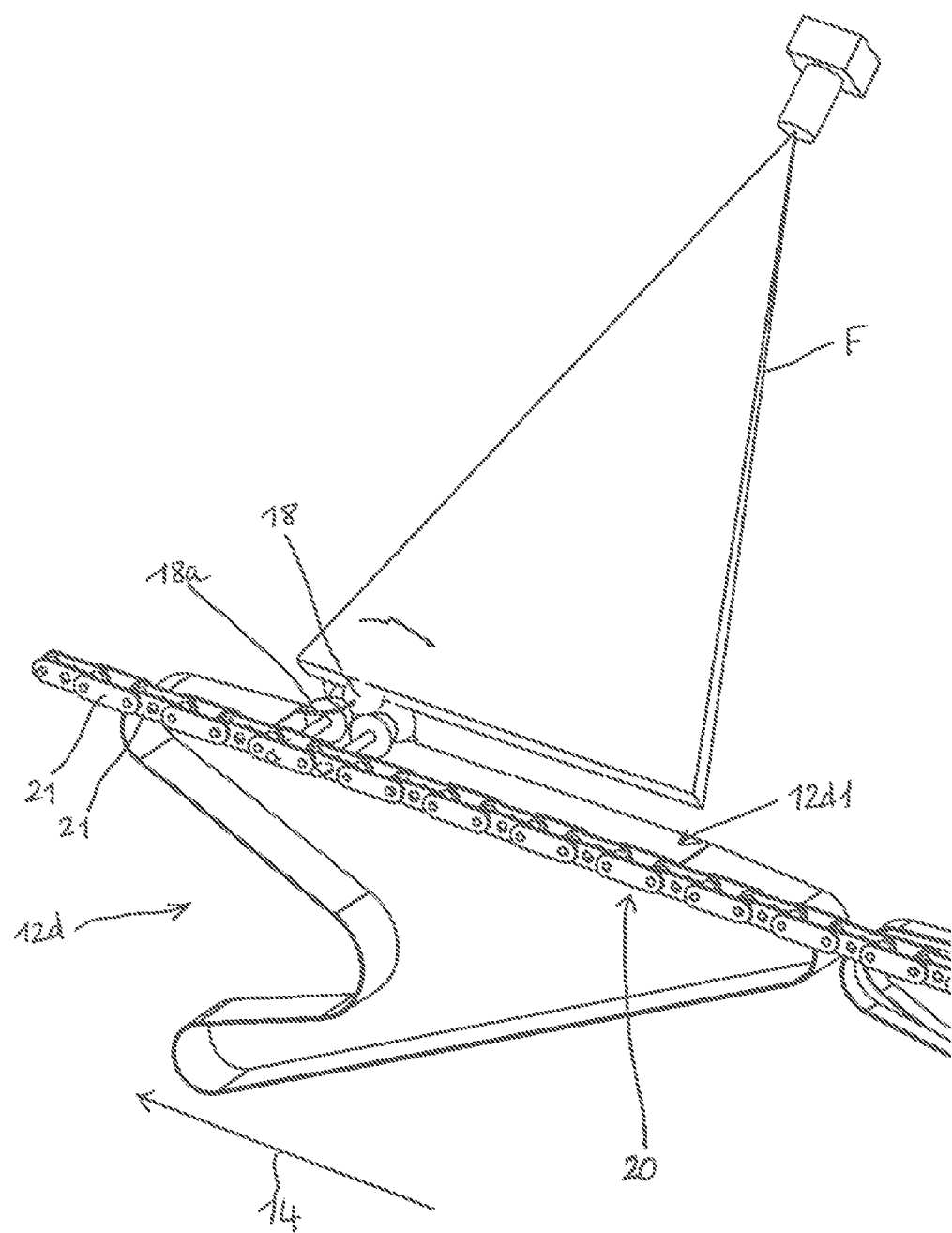

[Fig. 9C]
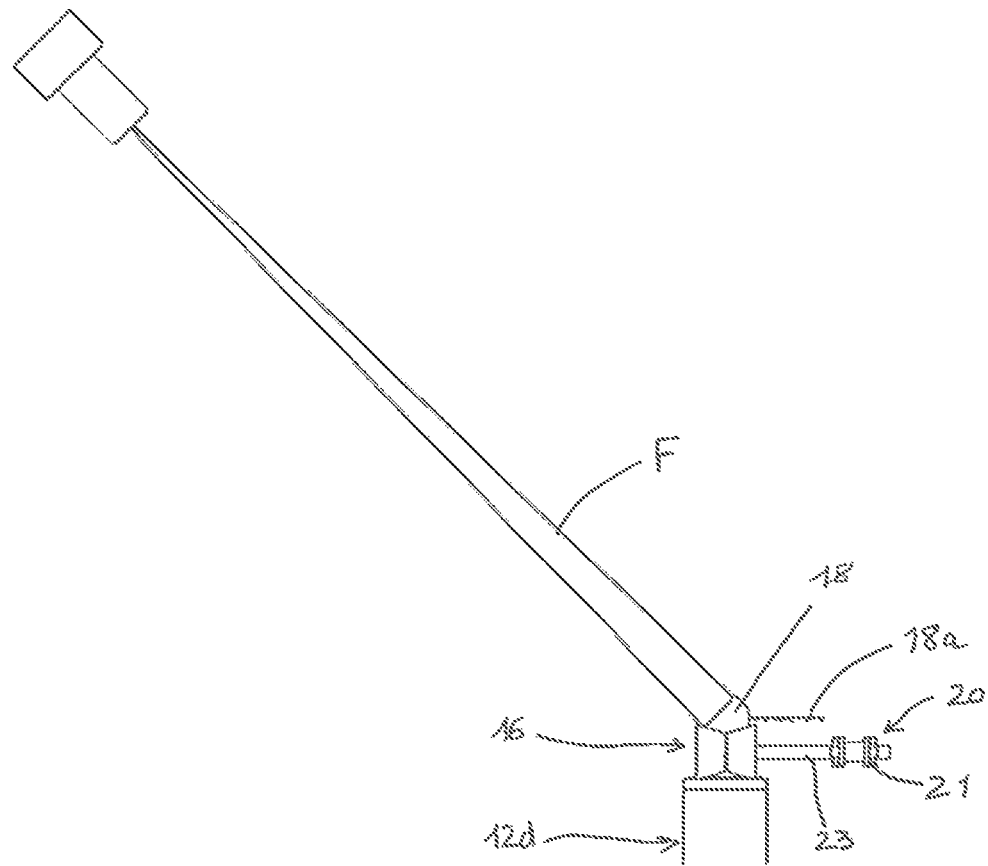

PROCESS AND SYSTEM FOR CONVEYING FRUIT AND VEGETABLES WITH AN ORIENTED STALK

RELATED APPLICATION

This application is a National Phase of PCT/EP2020/067122 filed on Jun. 19, 2020, which claims the benefit of priority from French Patent Application No. 19 06611, filed on Jun. 19, 2019, the entirety of which are incorporated by reference.

FIELD OF THE INVENTION

The present invention concerns a method and a system for conveying fruits and vegetables with a stalk enabling orientation of their stalk in a predetermined manner.

DESCRIPTION OF RELATED ART

The stalk of a fruit or a vegetable is the stem that supports the fruit or the vegetable. The word tail is also used in everyday language, for example for cherries.

Methods and devices for orienting a fruit with an umbilicus with a view to presentation thereof are known (JPH11116037, U.S. Pat. No. 6,691,854). Also known from WO2017/187076 are a method and a device for orienting a stalked fruit with a view to packaging it in which there are carried out successively a rotation of the stalked fruit about a horizontal rotation axis and then a rotation of the stalked fruit about a vertical rotation axis enabling the stalk to be brought into a predetermined position in order to package the fruit.

Also known are systems for conveying fruits and vegetables with a stalk in which the fruits or vegetables, termed objects, are transported on a conveyor line where sorting is effected. This may for example consist in sizing or sorting, in particular as a function of the color of the objects.

Each object is carried by supports that are moved by a longitudinal transport element such as a chain driving said objects in a longitudinal forward direction. Each support is typically formed of two dual cones placed one behind the other in the direction of advance of the chain and between which an object rests. The dual cones are driven in rotation on themselves in such a manner as to cause the object that they transport to rotate about a horizontal transverse axis in order for a system such as an imaging system to be able to inspect the surface of the object.

However, the inventor has noticed that the presence of the stalks on the objects constitutes an impediment to rotating said objects that rules out orienting the objects as would be wished. In particular, it is not possible to orient the objects so that the part of these objects that is opposite that carrying the stalk is oriented to one side of the conveyor line where a system for imaging or sorting the objects may be arranged. Thus sorting cannot be effected over all of the exterior surface of the object, in particular over all of the exterior surface of the object when rotating.

OBJECTS AND SUMMARY

The invention intends to remedy at least in part this disadvantage by proposing a method of transporting objects belonging to the group of fruits and vegetables with a stalk, characterized in that it includes the following steps:

conveying a plurality of objects on a conveyor line in a longitudinal forward direction, each conveyed object being carried by a support that is driven by the conveyor line in its longitudinal forward movement, rotating at least one support of an object in such a manner as to cause the rotation of said object about a non-horizontal axis and to confer on its stalk a predetermined geometric orientation.

This rotation of said at least one support enables geometric orientation of the stalk of the object in a required overall direction from a plurality of possible overall directions. In fact, the predetermined geometric position or orientation of the stalk in space is generally defined in an overall manner, that is to say inscribed in a three-dimensional angular geometric sector that is termed a solid angle (three-dimensional cone). Because of various operating parameters of the conveyor line and of the objects themselves, it is not possible to confer a more accurate predetermined geometric orientation and therefore to be certain that after rotation the stalk will be oriented at a precise angle for example relative to the horizontal, to the vertical or to the general direction of the conveyor line. Thus the predetermined geometric orientation that is conferred on the stalk by this rotation of said at least one support must be understood as being inscribed overall in a solid angle that is oriented toward one or the other of the two opposite sides that flank the conveyor line ("lateral" orientation of the stalk). Whether this relates to a vertical plane arranged transversely relative to the general direction of the conveyor line or a horizontal plane including the general direction of the conveyor line, the stalk is oriented inside a cone. Thus in such a vertical plane the stalk may be oriented upward, downward or horizontally. Likewise, in such a horizontal plane the stalk may be oriented toward the front, toward the rear or perpendicularly to the general direction of the conveyor line. This "lateral" orientation of the stalk enables orientation of the part of the object that is opposite that carrying the stalk facing a system such as an imaging system.

The step of rotating at least one support is a step of rotating and maintaining in rotation at least one support of an object during the longitudinal movement of the support driven by the conveyor line in its longitudinal forward movement, in such a manner as to cause the rotation of said object about a non-horizontal axis, to maintain the orientation of said object about that non-horizontal axis during the longitudinal movement of the support, and to confer on its stalk a predetermined geometric orientation and to maintain that predetermined geometric orientation during the longitudinal movement of the support. This regular rotation—that is to say one not disturbed by the presence of the stalk—of said object the stalk of which has the predetermined geometric orientation during the maintained rotation of said object advantageously, in some embodiments, enables an analysis of the whole of the surface of the object, in particular by an imaging system. The predetermined geometric orientation of the stalk is advantageously maintained during the rotation of the object during its transport on the conveyor line.

In accordance with one possible feature, each support comprises at least two parts that are disposed alongside one another in accordance with an arrangement transverse relative to the longitudinal forward direction and each of which is mobile in rotation independently of the others, the step of rotating said at least one support comprising rotating said at least two parts at different speeds from one another; this speed difference imposed on said at least two parts of the support enables the object to be turned about a non-horizontal axis and thus to orient the object and therefore its stalk in a plurality of possible geometric orientations; the selection of a speed difference enables adjustment of the overall geometric orientation of the stalk; in practise, different speeds are chosen for the first part of the support and for the second part disposed alongside the first part in accordance with a transverse arrangement; to be more specific, the speed difference may be applied to the elements or members that drive one and/or the other of said at least two parts of the support in rotation.

In accordance with other possible features:

the rotation of said at least one support orients or positions the stalk and therefore also the part of the object to which the stalk is attached in a transverse overall orientation relative to the longitudinal forward direction; the stalk is therefore oriented overall to one of the two opposite sides or lateral flanks of the conveyor line; as already mentioned, in a vertical transverse plane this orientation can be upward, downward or horizontal and in a horizontal plane this orientation can be toward the front, toward the rear or perpendicular to the general direction of the conveyor line;

the method includes a step of rotating said at least one support that is effected at least during a step of inspection or of transformation of the object carried by said support with its stalk oriented, in such a manner as to cause the rotation of said object on itself about an axis (for example a horizontal and transverse axis), preserving the transverse overall orientation of the stalk of the object; an inspection step can be carried out with the aid of an optical system or some other type of system, the inspection generally being effected with the aim of detecting any defects on the object in order to sort the objects as a function of the result of this step; for example, it is thus possible to inspect in particular the part of the object that is situated opposite the part to which the stalk is connected, which part of the object is oriented in a globally transverse manner, that is to say globally facing one of the two opposite sides of the line; the rotation step may be effected about an axis that is not necessarily horizontal and transverse as a function of what is required; it should be noted that the object carried by the support is generally rotated in order to be able to inspect as completely as possible the part of the object that is situated opposite the part of the object to which the stalk is connected; however, rotation of the object carried by the support is generally not necessary to effect a transformation of the object such as cutting off the stalk;

prior to the rotation of said at least one object support the aim of which is to cause the rotation of said object about a non-horizontal axis and to confer on its stalk a predetermined geometric orientation, the method includes at least one preliminary step of rotating said at least one support in such a manner as to cause the adapted rotation of said object carried by said support about a horizontal transverse axis in order to confer on the stalk of the object a preliminary geometric orientation;

to obtain the preliminary geometric orientation of the stalk, the method may for example include a single preliminary step of rotation of said at least one support in such a manner as to cause the adapted rotation of said object carried by said support about a horizontal transverse axis and to confer on its stalk a preliminary longitudinal geometric orientation that is directed toward the rear or toward the front of the conveyor line; alternatively, the method may include two successive preliminary steps of rotation of said at least one support in such a manner as to cause the adapted rotation of said object carried by said support about a horizontal transverse axis and to confer successively on its stalk a first longitudinal geometric orientation that is directed overall toward the rear or toward the front of the conveyor line and a second longitudinal geometric orientation that is directed opposite to the first geometric orientation and corresponds to the preliminary geometric orientation of the stalk; these two successive rotations make it possible to ensure that the stalks of the objects will all have the same preliminary geometric orientation before undergoing the rotation that will confer on them the predetermined geometric orientation; whatever the number of rotations, the pre-orientation or pre-orientations of the stalks can be obtained by using lateral guide elements that flank the two opposite sides of the conveyor line and therefore the supports of the objects and thus enable participation in the orientation of the stalks during the rotation of the objects by guiding the stalks.

The invention also has for object a system for transporting objects belonging to the group of fruits and vegetables with a stalk, including:

a conveyor line that can be driven in movement in a longitudinal forward direction, a plurality of supports that can be driven by the conveyor line in its longitudinal forward movement and each of which is able to carry an object, characterized in that the conveyor line comprises a device for rotating at least one support of an object in such a manner as to cause said object to rotate about a non-horizontal axis and to confer on its stalk a predetermined geometric orientation.

This system has the same advantages as the method briefly described hereinabove. As for the method, the conveyor line is able to transport numerous supports and objects as appropriate to a given conveying throughput and given production constraints. Moreover, this system is particularly simple to use and efficient.

In accordance with other possible features:

each support carrying an object comprises at least two parts that are disposed alongside one another in accordance with an arrangement transverse relative to the longitudinal forward direction, each part being mobile in rotation independently of the others, the conveyor line comprising two longitudinal conveyor elements parallel to each other that are respectively able to drive said at least two parts of each mobile object support at speeds of longitudinal forward movement or longitudinal movement different from each other in such a manner as to cause rotation of the object about a non-horizontal axis and to convert on its stalk a predetermined geometric orientation; the choice of the speed difference between the two parallel longitudinal conveyor elements takes account of the speeds that it is possible in practice to apply to those elements and production constraints; the longitudinal conveyor elements are generally disposed under and in contact with the supports;

each support carrying an object is formed by two elongate support elements each disposed transversely relative to the longitudinal forward direction, one behind the other and conjointly conformed to receive the object to be carried; the two elements are more particularly disposed adjacent to one another in order together to define a cavity housing to receive the object to be carried;

each transverse elongate support element comprises two portions disposed alongside one another in accordance with the transverse arrangement of said element relative to the longitudinal forward direction, each of the two portions being mobile in rotation independently of one another;

each transverse elongate support element has a general shape of revolution about the longitudinal axis of said elongate element;

each of the two portions of each transverse elongate support element is a cone or a truncated cone the apexes of which are oriented face-to-face or the bases of which are distanced from each other;

each longitudinal conveyor element is chosen from a conveyor belt, a chain, a belt . . . or any other element capable of providing the same function;

the object transport system includes a contactless system for sorting the objects carried by the supports; this contactless sorting system may be an optical system enabling an optical analysis of the objects by imaging; the sorting system may be disposed on the conveyor line downstream of the zone in which the two parallel longitudinal conveyor elements are situated or it may be situated in part downstream of that zone and in part in said zone, or even otherwise;

the object transport system includes a system for transformation of the objects carried by the supports.

BRIEF DESCRIPTION OF THE DRAWINGS

Other features and advantages will become apparent during the following description given by way of non-limiting example only and with reference to the appended drawings, in which:

FIG. 1B is a partial view in a vertical transverse plane of an object 18 on its support 16 with its stalk 18a oriented to the side at the level of the third station 12c from FIG. 1A;

FIG. 1C is a partial view from above in a horizontal plane of the object from FIG. 1B;

FIG. 2 is a schematic view from above of one possible example of an object support in accordance with one embodiment of the invention;

FIG. 3 represents the support from FIG. 2 carrying an object 18;

FIG. 4 is a view in longitudinal section of the support from FIGS. 2 and 3;

FIG. 5 is a detailed view in perspective and to a larger scale of the third station 12c from FIG. 1A;

FIG. 6 is a perspective view to a larger scale of a first rotation of an object to obtain a first pre-orientation of its stalk at the first station 12a;

FIG. 7 is a perspective view to a larger scale of a second rotation of the object from FIG. 6 to obtain a second pre-orientation of its stalk at the second station 12b;

FIG. 8A illustrates the start of rotation of the object from FIG. 7 at the third station 12c;

FIG. 8B illustrates the continued rotation of the object initiated in FIG. 8A at the third station 12c;

FIG. 8C illustrates the end of rotation of the object represented in FIGS. 8A and 8B;

FIG. 9A represents a rotation of the object at the fourth station 12d with the predetermined geometric orientation obtained at the third station;

FIG. 9B is a general perspective view of a system for object inspection, sorting or analysis operative at the fourth station 12d;

FIG. 9C is a transverse view of the system and of the fourth station 12d from FIG. 9B.

DESCRIPTION OF EMBODIMENT(S)

Figure 1A:
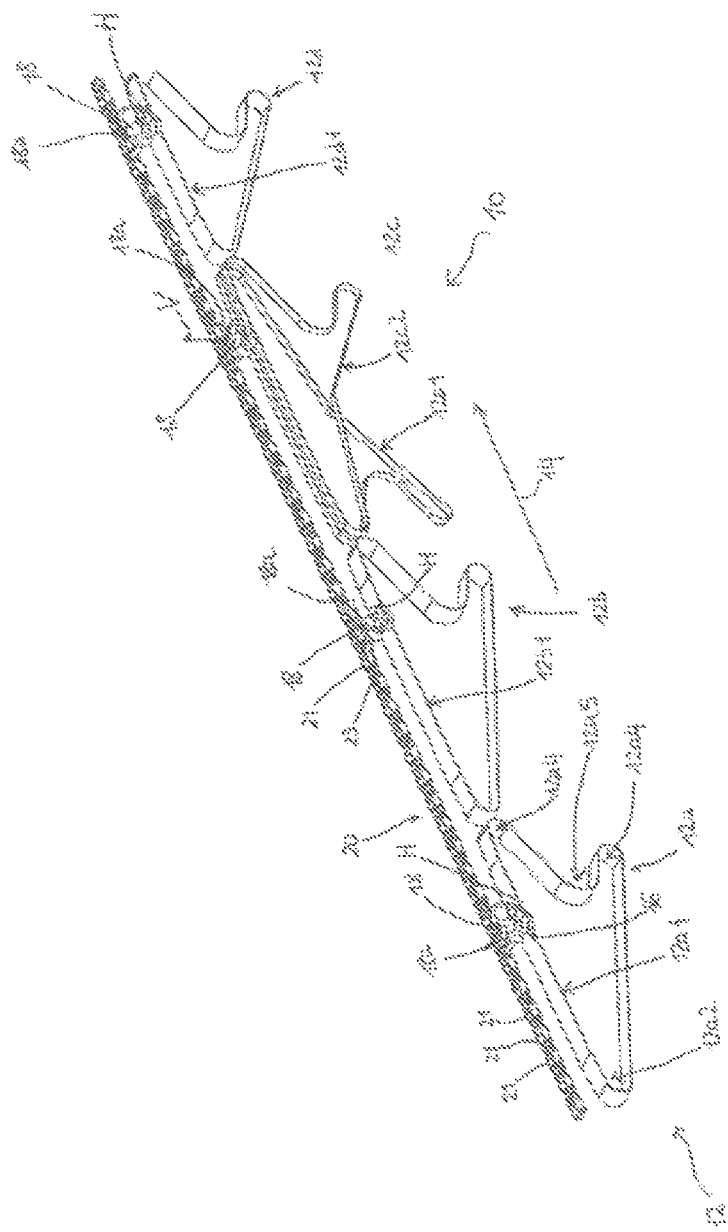
FIG. 1A is a schematic general view in perspective showing one possible combination of a plurality of stations for rotating an object carried by a support in accordance with one embodiment of the invention.

FIG. 1A represents in a very schematic manner a system 10 for transporting or conveying objects belonging to the group of fruits and vegetables with a stalk. The stalk of a fruit or of a vegetable is the stem that supports the fruit or the vegetable. In the example represented and that will be returned to in the other figures the objects transported are cherries but may of course be any other fruit or vegetable with a stalk.

The transport system 10 comprises a conveyor line 12 that is able to be driven in movement in a longitudinal forward direction represented in a symbolic manner by the arrow 14 that goes from left to right in FIG. 1A.

The system 10 also comprises a plurality of supports that are, on the one hand, able to be driven by the conveyor line 12 in its forward movement in the longitudinal direction 14 and, on the other hand, each able to carry an object such as a cherry in this example. In the example represented in FIG. 1A only one possible example of an object support 16 is represented to make the explanation clear and only one object 18 carried by a support 16 is represented with its stalk 18a. This example of an object support will be illustrated in more detail in FIGS. 2 to 4. In FIG. 1A the same object support 16 is represented at the various processing stations of the conveyor line that will be described in detail later in FIG. 5 and following. When the conveyor line is functioning, a plurality of object supports and objects are generally disposed one behind the other on the conveyor line, for example at a distance of a few centimeters from one another, in order to produce the industrial production throughput.

The conveyor line 12 comprises an endless chain 20 known in itself that is wound on two end sprockets or hoops (not represented) so as to form an endless loop. At least one of the two sprockets is driven in rotation by a motor device (not represented) relative to the frame (not represented) of the conveyor line so that the endless chain 20 is also driven by that sprocket in a continuous manner in its longitudinal direction and in the direction indicated by the arrow 14. Alternatively, another drive system could be used in the conveyor line to drive the supports in a movement of longitudinal translation. The object supports are fixed to the endless chain that is formed by successive links 21, known in themselves, articulated to one another two by two by transverse horizontal pins 23 all parallel to one another. A transverse pin is arranged perpendicularly to the longitudinal forward direction 14 of the conveyor line and here it is a horizontal pin. The object supports are for example fixed to the transverse pins of the links or by means of another part. The transverse pins 23 of the links 21 extend transversely and project to the side of the endless chain 20 to enable the mounting on these pins of the object supports that will be described later. Those object supports move longitudinally, parallel to and alongside the endless chain, in a common horizontal plane.

The transport system 10 enables the stalks 18a of the objects carried by the supports to be oriented with a predetermined geometric orientation, for example, in order to effect a sorting of those objects, in particular without contact, by inspecting/analyzing the objects with any chosen orientation, for example with the aim of detecting any defects on one or more objects. The sorting may be carried out by effecting an optical analysis by imaging the objects. The fact of being able to orient the stalks of the objects in accordance with a predetermined geometric orientation chosen from a plurality of possible predetermined geometric orientations enables an optical analysis by imaging over all the exterior surface of the objects and in particular in the zone or part of the objects that is opposite that to which the stalk is connected. It will be noted that a plurality of successive predetermined successive geometric orientations may be imparted to the stalks of the objects in order that the latter can be inspected/analyzed in these various possible orientations.

The conveyor line 12 comprises a succession of processing stations or zones aligned one behind the other in the longitudinal direction 14, parallel to the endless chain 20, and through which the object supports conveyed by the line pass.

In the example represented in FIG. 1A there are four processing stations 12*a-d* although a different number of stations may be envisaged in other configurations.

The first two stations 12*a* and 12*b* for rotating the objects are optional and here have the object of ensuring that the stalks of the objects carried by the successive supports all have the same preliminary geometric orientation on arriving at the third processing station 12*c*. The order of the stations 12*a* and 12*b* may be reversed. It is a question as it were of carrying out a pre-positioning or a (longitudinal front or rear) pre-orientation of the stalks of the objects. Moreover, only one of the stations may be used to confer a preliminary geometric orientation or front or rear longitudinal pre-orientation on the stalks ahead of the third station. Alternatively, the conveyor line may not include any station for pre-orientation of the stalks of the objects ahead of the station 12*c*.

The third station 12*c* has for object conferring on each of the stalks 18*a* of the objects carried by the supports a predetermined geometric orientation that is the same for all the stalks of the objects. This geometric orientation will be used at the next station, here in this instance for an inspection/analysis of the objects oriented in this way. Alternatively, this geometric orientation may be used for other purposes, for example for a step of transformation of the objects such as cutting off the stalks. This geometric orientation is obtained by causing each object to turn about a non-horizontal axis which in the example represented in FIG. 1A is a vertical axis V. In the illustrated example the stalks 18*a* are globally oriented toward one of the two opposite side or flanks of the conveyor line in such a manner that the zone or part of the object that is opposite that connected to the stalk is oriented in the direction of the opposite side of the conveyor line. For simplicity the stalk represented at the third station 12*c* has a geometric orientation that coincides precisely with a transverse horizontal direction but it will emerge hereinafter that in practise the geometric orientation of the stalks does not necessarily coincide with any such direction.

The geometric orientation conferred on the stalk of the object is considered in an overall manner, that is to say corresponds to a geometric orientation that has a main overall direction, for example a "transverse" or "lateral" direction relative to the longitudinal forward direction of the conveyor, but which may vary about that main direction within a solid angle centered on said main direction. There has been shown in FIG. 1B (partial view of an object 18 on a support 16 with its stalk 18*a* oriented to the side in a vertical transverse plane at the level of the third station 12*c*) and 1C (partial view from above of the same object 18 on the support 16 with its stalk oriented to the side in a horizontal plane at the level of the third station 12*c*) an illustration of this overall geometric orientation inscribed in a solid angle As. A solid angle As is defined as being a portion of the space delimited by a cone the apex of which is the apex of the solid angle. The cone is for example a cone of revolution. Here the apex of the cone is situated at the base of the stalk 18*a*, where it connects to the object. The predetermined geometric orientation conferred on the stalk 18*a* of the object is therefore included in this solid angle but does not necessarily correspond to the main direction Ds of this solid angle which, in the aforementioned example, corresponds to a transverse horizontal direction. The cone of the solid angle generally has a half-angle α at the apex that is less than 90° and so the stalk 18*a* of the object is able to adopt a predetermined geometric orientation departing from the main direction of the solid angle at an angle less than 90°. For simplicity and consistency, the stalk in FIGS. 1B and 1C has been represented with the same orientation as in FIG. 1A. Thus, in the example of an overall geometric orientation of the stalk in a main direction Ds that is transverse or lateral relative to the direction of longitudinal advance of the conveyor (arrow 14 in FIG. 1C):

in a vertical plane arranged transversely relative to the general direction of the conveyor line (FIG. 1B), the stalk 18*a* can be oriented horizontally, that is to say precisely in the main direction Ds of the solid angle As, or upward or downward relative to that horizontal orientation, the upward or downward orientation being contained within the solid angle As concerned, that is to say at an angle of inclination less than 90° relative to the main direction Ds of the cone when seen in a vertical plane; or in a horizontal plane including the general direction of the conveyor line (FIG. 1C), the stalk 18*a* may be oriented perpendicularly to the general direction of the conveyor line (direction Ds), or toward the front or the rear relative to this perpendicular orientation, that is to say at an angle of inclination less than 90° relative to the main direction Ds of the cone when seen in a horizontal plane. The dashed lines departing from the apex of the cone in FIGS. 1B and 1C illustrate possible examples of geometric orientations each of which corresponds to the overall predetermined geometric orientation contained in the solid angle with "transverse" main direction Ds. Everything stated hereinabove with reference to a globally "transverse" or "lateral" geometric orientation may be applied to any other geometric orientation.

Other predetermined geometric orientations of the stalks of the objects at the third station 12*c* can of course be envisaged by effecting a rotation about a non-horizontal axis that is not vertical. The orientation chosen here is merely one example taken from a plurality of other possible orientations.

After passing through the third station 12*c* the stalks all have the same predetermined geometric orientation (here overall facing one of the sides of the conveyor line and, to be more precise, in the direction of the endless chain) and arrive at the fourth station 12*d* where the objects are driven in rotation on themselves about a transverse horizontal axis H relative to the longitudinal forward direction 14 of the conveyor line. The overall lateral predetermined geometric orientation of the stalks 18*a* (facing the side) is preserved during this step even if the stalk is caused to turn on itself during this rotation. In this step the objects can be inspected for example by an optical analysis system using imaging known in itself and not represented.

Generally speaking, an object support in the sense of the inventive comprises at least two parts that are disposed one alongside the other in a transverse arrangement relative to the longitudinal forward direction 14 of the conveyor line. Each of said least two parts is mobile in rotation independently of the other part and the rotation of each part is generally effected about an axis that is transverse relative to the longitudinal forward direction 14. This configuration enables one of said at least two parts to be rotated at one speed while the other part is rotated at a different speed, which enables the object carried by said at least two parts to be made to turn about a non-horizontal axis (vertical axis H in the example described) and thus to orient the stalk of the object in accordance with the chosen geometric orientation. Alternatively, one of said at least two parts may be rotated at one speed while the other part is not rotated. Of course, each of said at least two parts may be rotated at the same speed, if required.

As represented as seen from above in FIG. 2, an object support 16 in accordance with one embodiment of the invention is formed by two elongate support elements 16a and 16b that are disposed transversely one behind the other in the longitudinal forward direction 14. The two elongate support elements 16a and 16b are disposed adjacent to one another (not necessarily in contact) and conjointly shaped to receive the object to be carried between them. The object is positioned in a housing (cavity) that is defined partly by the longitudinal space E formed between the two elements 16a and 16b and partly by the two facing adjacent parts of said two elements. FIG. 3 illustrates an object (e.g. cherry) 18 carried by the two elements 16a and 16b. These elongate support elements may of course carry other types of fruits and vegetables as required.

As represented in FIGS. 2 and 3, each elongate support element 16a-b may have a general shape of revolution about the longitudinal axis of the element.

Each elongate support element 16a-b is disposed transversely relative to the longitudinal forward direction 14 so that the longitudinal axis of each elongate element has a transverse disposition (transverse arrangement symbolized by the line identified by the letter T in FIG. 2).

As represented in section in FIG. 4, each elongate support element 16a-b is mounted to rotate freely on a transverse pin 17a-17b corresponding to the longitudinal axis of the element. The transverse pin 17a-17b is for example coupled mechanically to the transverse pin 23 of a link 21 of the chain (not represented in the figures) or alternatively corresponds to the transverse pin itself.

As represented in FIGS. 2 to 4, each elongate support element 16a-b comprises two portions disposed one alongside the other in the transverse arrangement T of each element. The two portions 16a1, 16a2 of the element 16a (resp. 16b1, 16b2 of the element 16b) are aligned with one another along the transverse pin 17a (resp. 17b), mounted to rotate freely about said pin and mobile in rotation independently of one another.

Each elongate support element portion 16a-b has for example a general shape of frustoconical appearance and the two portions of frustoconical general shape are disposed one relative to the other in such a manner that the apexes of the cones are oriented one in the direction of the other while the bases of the cones are disposed at a distance from one another (the bases are disposed outside the support). The general configuration of each elongate support element portion has a dual cone or hourglass general shape. The object carried by the two elongate support element portions therefore rests in contact with the frustoconical zones of each of the portions illustrated in FIGS. 2 to 4. Other general shapes of elongate support element portions may be used in alternative embodiments. Likewise, the general shapes of frustoconical appearance may feature variations of shape, in particular locally. For example, a plurality of disks arranged side-to-side in a transverse disposition may form an elongate support element. The disks may all have the same diameter or the disks disposed at the two opposite ends of the arrangement may have diameters greater than those of the intermediate disks. The general profile of these disks arranged transversely side-by-side may for example follow the shape or contour of an hourglass or a diabolo.

Referring again to FIG. 1A, each of the first two stations 12a-b and the fourth station 12d has the same configuration in this example and comprises a longitudinal conveyor element 12a1, 12b1 and 12d1 on which the supports 16 rest. In contact with each of those elements 12a1, 12b1 and 12d1 in motion at a certain speed, the supports 16 that are driven in a movement in longitudinal translation by the endless chain 20 at a different given speed are also driven in rotation about a transverse horizontal axis H.

Each longitudinal conveyor element 12a1, 12b1 and 12d1 is for example a belt known in itself that is wound onto two end pulleys (not represented) as well as onto third and fourth pulleys (not represented) disposed in the lower part in such a manner that the belt configured in this way forms an endless loop substantially arranged in a longitudinally extending vertical plane. There have been identified on the first station 12a only the locations of the various transverse rotation axis pulleys: the locations 12a2 and 12a3 of the end two pulleys and the location 12a4 of the third pulley which is for example an idler pulley and the location 12a5 of the fourth pulley which is for example a driving pulley, the driving motor device of this pulley not being represented here. Conversely, the driving pulley and the idler pulley may be interchanged. The driving pulley is driven by the motor device in rotation in a continuous manner relative to the aforementioned frame so that the belt is also driven in a continuous manner in the longitudinal direction and in the direction indicated by the arrow 14.

It will be noted that the longitudinal conveyor element described here may be replaced by a conveyor belt, a chain or any other element provided that the object supports can be driven in rotation on themselves in contact with this longitudinal conveyor element, the length of which is adjusted to cooperate with a plurality of object supports.

The third station 12c of the conveyor line from FIG. 1A comprises two parallel longitudinal conveyor elements 12c1 and 12c2 each of which is able to move in the longitudinal forward direction 14 at a different longitudinal forward speed in such as manner as to cause to turn at different rotation speeds the parts of the object supports in contact with the respective two longitudinal conveyor elements 12c1 and 12c2 (these longitudinal forward speeds are different from the forward speed of the endless chain that drives the object supports in a longitudinal forward movement). A speed difference is therefore created between the two independently mobile parts of each support, which therefore imposes a rotation speed difference at the level of the zones of the object in contact with those respective parts.

FIG. 5 illustrates in more detail one example of a possible configuration for the third station 12c. Here each longitudinal conveyor element is a belt but, as for the longitudinal conveyor elements of the other stations, it may take any other form such as a conveyor belt, a chain, etc. Each longitudinal conveyor element is conformed vertically in such a manner as to form an endless longitudinal element wound around a plurality of pulleys and/or rollers for guiding it and driving it, in particular in translation in the longitudinal forward direction 14. As represented in FIG. 1, each longitudinal conveyor element 12c1, 12c2 has a width (transverse dimension) less than that of the longitudinal conveyor elements of the other stations so that the two longitudinal conveyor elements 12c1 and 12c2 can be arranged side to side without touching whilst being able to come into contact with the parts mobile in rotation of the object supports, and this without any overall increase in the transverse overall size of the conveyor line.

To be more specific, each longitudinal conveyor element is mounted on and wound around two end pulleys 12c3 and 12c4 and the horizontal longitudinal part of each element situated between these two pulleys is supported by a central chassis 12c5 (a similar chassis may be present for each of the belts of the other stations). Starting from a first of the two end pulleys (the first end pulley is not the same for the two conveyor elements), each longitudinal conveyor element is conformed in such a manner as to be wound around a driving pulley 12c6 (for the element 12c2) and 12c7 (for the element 12c1) situated at a height lower than that of the starting end pulley and offset vertically relative to the latter. Each driving pulley is mounted on a transverse pin t1 or t2 connected at one end to a motorized driving unit G1 or G2, for example of the gear motor type, and at the opposite end to the aforementioned frame, not represented. Each longitudinal conveyor element then extends in such a manner as to be wound around a tension roller 12c8 (in the case of the element 12c2) or 12c9 (in the case of the element 12c1) situated at a height lower than that of the driving pulley and offset vertically relative to the latter. Each longitudinal conveyor element then rises in the direction of the second end pulley and passes over an intermediate pulley or roller 12c10, for example common to the two longitudinal conveyor elements. The two parallel longitudinal conveyor elements have a configuration symmetrical with respect to each other relative to a vertical plane containing the rotation axis of the roller 12c10. Thus, starting from the idler pulleys, the two longitudinal conveyor elements each rise in the direction of their second, upper end pulley, crossing over at the level of the roller 12c10 in a view projected into a vertical plane perpendicular to the two transverse pins t1 and t2. All the rotation axes of the various pulleys and rollers are transverse, parallel to one another and perpendicular to a common vertical plane.

There will now be described with reference to FIGS. 6 to 9 various successive steps of one embodiment of a method of transporting or conveying objects employed by the transport or conveyor system 10 that has just been described. It will be noted that the method may alternatively be used by a differently configured system.

In FIG. 6 there has been represented an object support 16 formed of two elongate support elements 16a and 16b of the type described with reference to FIGS. 2 to 4 and that can jointly carry on top of them an object 18 that has a stalk 18a. As illustrated by the arrow R1, here an anticlockwise rotation is applied to the object support about a transverse horizontal axis H. The rotation movement is applied in a simultaneous manner to each of the two portions 16a1, 16a2 and 16b1, 16b2 of each elongate support element 16a and 16b that are all in contact with the same longitudinal conveyor element 12a1 driven in translation in the direction 14 (first station 12a). Here the anticlockwise rotation is obtained thanks to a speed of movement of the longitudinal conveyor element 12a1 that is less than the speed of movement of the endless chain 20 from FIG. 1A. The first preliminary rotation effected enables a rear longitudinal pre-orientation to be conferred on the stalk 18a. This pre-orientation is also obtained thanks to the presence of two parallel walls that laterally frame the conveyor element 12a1 in order to guide the orientation of the stalk of the object toward the rear and to prevent it from being positioned in an uncontrolled manner on one of the sides. Only the rear wall P1 is represented here while the front wall has been omitted in order not to overload the drawing.

In FIG. 7 there has represented the same object support 16 as in FIG. 6 with the object 18. As illustrated by the arrow R2, here a clockwise rotation is applied to the object support about a transverse horizontal axis H. The rotation movement is applied in a simultaneous manner to each of the two portions 16a1, 16a2 and 16b1, 16b2 of each elongate support element 16a and 16b that are all in contact with the same longitudinal conveyor element 12b1 driven in translation in the direction 14 (second station 12b). Here the clockwise rotation is obtained thanks to a speed of movement of the longitudinal conveyor element 12a1 that is greater than the speed of movement of the endless chain 20 from FIG. 1A. The second preliminary rotation effected enables a front longitudinal pre-orientation to be conferred on the stalk 18a. This pre-orientation is also obtained thanks to the presence of two parallel walls that laterally frame the conveyor element 12b1 in order to guide the orientation of the stalk of the object from the rear (FIG. 6 pre-orientation) to the front during the rotation of the object (here the stalk pivots from the rear to the front thanks to the presence of the lateral walls that constrain its movement in accordance with this longitudinal arrangement). The two lateral walls have not been represented here for clarity but they are similar to those in FIG. 6.

The objects the stalks 18a of which have been pre-oriented or pre-positioned toward the front at the second station 12b (the same reasoning may be effected with an orientation of the stalk toward the rear) reach the third station 12c where they will be subjected to a speed difference by means of the support parts that carry them.

At the third station 12c each longitudinal conveyor element 12c1, 12c2 is driven in a movement in longitudinal translation at a speed that differs from one element to the other thanks to the respective motorized driving units associated with those elements (FIG. 5) and which may be controlled in an appropriate and selective manner, in particular an automatic manner. Thus the two portions 16a1 and 16b1 of the two elongate support elements 16a and 16b are driven in rotation about their longitudinal axis (see FIGS. 2 to 4) by the conveyor element 12c1 at a first speed while the two portions 16a2 and 16b2 of the two elongate support elements 16a and 16b are driven in rotation about their longitudinal axis (see FIGS. 2 to 4) by the conveyor element 12c2 at a second speed different from the first. By appropriately selecting the speed difference between the two longitudinal conveyor elements the support parts concerned are rotated in an appropriate and independent manner (with different speeds between the support parts situated in contact with the two adjacent conveyor elements), which causes rotation of the object 18 about a non-horizontal axis. As represented in FIG. 8A, the rotation imparted to the object and to its stalk is here a rotation with vertical axis V symbolized by the arrow R3 (anticlockwise rotation). To obtain this rotation the speed at which the conveyor element 12c1 is driven is greater than that of the conveyor element 12c2 and the speed of movement of the endless chain 20 from FIG. 1A is between the speeds at which the two conveyor elements are driven.

It will be note that if the stalk 18a arrives at the third station 12c with a rearward orientation it would then be necessary to rotate the object about a vertical axis in a rotation movement in the opposite direction to that represented in FIG. 8A (that is to say a clockwise rotation) in order to arrive at the exit from the third station with the same orientation of the stalk. To this end, it would be necessary to interchange the orders of magnitude of the speeds at which the conveyor elements are driven.

FIGS. 8B and 8C illustrate the end of the rotation movement of the third station 12c that was initiated in FIG. 8A and show that the stalk 18a has been oriented in a transverse overall manner relative to the longitudinal forward direction of the longitudinal conveyor elements, as explained above, in particular with reference to FIGS. 1A-C. The stalk is therefore oriented overall on one side of the conveyor line, here the side that faces the endless chain. Alternatively, the stalk may be oriented in the direction of the opposite side. A further alternative is for the stalk to adopt an orientation different from those that have just been mentioned as a function of the requirements of the conveyor line and of the operations to be effected.

The objects of which the stalks 18a have been globally oriented or positioned to the side or laterally at the third station 12c (the same reasoning may be effected with a different orientation of the stalk) reach the fourth station 12d where they will be subjected for example to an inspection or analysis step as a function of their orientation or position.

FIG. 9A illustrates the progress of this step, nevertheless omitting to represent the inspection, sorting (e.g. by size) or analysis system of known type that may be used. The stalk 18a of the object 18 being oriented in a globally transverse manner relative to the longitudinal forward direction 14 of the conveyor line, the transverse overall orientation of the stalk is substantially preserved during the rotation, in accordance with the anticlockwise arrow R4, of all the mobile portions of the object support 16 about a transverse horizontal axis H. The object and its stalk are therefore driven in rotation about the axis H during this step, which in particular enables inspection of the zone of the object that is opposite that to which the stalk is connected, which was very difficult with the techniques known from the prior art. In particular this step enables inspection or analysis of the objects carried by the supports, in particular of zones of those objects that are difficult to access, without establishing any physical contact with said objects. This is particularly advantageous when it is wished not to take the risk of damaging them through physical contact. It will be noted that the step of rotation of the object during the inspection step is not obligatory. According to a variant, the rotation may be effected in a temporary manner during the inspection step.

As the stalk is able to assume different predetermined geometric orientations following the rotation effected at the third station 12c (about a non-horizontal axis), different zones of the object can then be inspected at the fourth station according to the requirements of the installation.

FIGS. 9B and 9C illustrate an inspection, sorting or analysis system 30 of known type for effecting a contactless inspection step on the parts of the objects 18 opposite those carrying the stalk oriented in a transverse overall manner at the level of the fourth station 12d. As represented in these figures, the inspection system 30 is for example of optical type. It is disposed at a height relative to the side on which the conveyor line is found and on the side opposite the side to which the stalk of the objects is oriented (FIG. 9C). The inspection system 30 is for example an optical imaging system of known type. As represented in these figures, the system 30 emits an optical beam F that is for example sufficiently wide to encompass a plurality of objects simultaneously (FIG. 9B), although this is in no way obligatory.

In accordance with a variant not represented, a system for transformation of the objects may be added to the conveyor line, for example to carry out a step of transformation on the objects, in place of the inspection, sorting or analysis step or in addition to that step and, for example, following that step.

The envisaged transformation generally necessitates contact with the objects to be transformed and may for example be a step of cutting off the stalks of the objects, although other transformations may be envisaged.

The invention claimed is:

1. A method of transporting objects belonging to the group of fruits and vegetables with a stalk, said method comprising the following steps:
   conveying a plurality of objects on a conveyor line in a longitudinal forward direction, each conveyed object being carried by at least one support that is driven by the conveyor line in its longitudinal forward movement,
   rotating said at least one support of an object in such a manner as to cause the rotation of said object about a non-horizontal axis,
   wherein said at least one support is rotated in such a manner as to confer on the stalk of said object a predetermined geometric orientation, and to maintain that predetermined geometric orientation during the rotation of said object about the non-horizontal axis.

2. The method as claimed in claim 1, wherein each support comprises at least two parts that are disposed alongside one another in accordance with an arrangement transverse relative to the longitudinal forward direction and each of which is mobile in rotation independently of the others, the step of rotating said at least one support comprising rotating said at least two parts at different speeds from one another.

3. The method as claimed in claim 1, wherein the rotation of said at least one support orients the stalk in an orientation globally transverse relative to the longitudinal forward direction.

4. The method as claimed in claim 3, wherein said method includes a step of rotating said at least one support that is effected at least during a step of inspection or of transformation of the object carried by said support with its stalk oriented, in such a manner as to cause the rotation of said object on itself about an axis, preserving the transverse overall orientation of the stalk of the object.

5. The method according to claim 1, wherein, prior to the rotation of said at least one support the aim of which is to cause the rotation of said object about the non-horizontal axis and to confer on its stalk the predetermined geometric orientation, the method includes at least one preliminary step of rotating said at least one support in such a manner as to cause the adapted rotation of said object carried by said support about a horizontal transverse axis in order to confer on the stalk of the object the preliminary geometric orientation.

6. A system for transporting objects belonging to the group of fruits and vegetables with a stalk, including:
   a conveyor line that can be driven in movement in a longitudinal forward direction,
   a plurality of supports that can be driven by the conveyor line in its forward movement and each of which is able to carry an object, in which the conveyor line comprises a device for rotating at least one support of the plurality of supports of an object in such a manner as to cause said object to rotate about a non-horizontal axis and to confer on its stalk a predetermined geometric orientation;

wherein the rotator device is adapted to maintain that predetermined geometric orientation during the rotation of said object about the non-horizontal axis.

7. The system as claimed in claim 6, wherein each support carrying an object comprises at least two parts that are disposed alongside one another in accordance with an arrangement transverse relative to the longitudinal forward direction, each part being mobile in rotation independently of the others, the conveyor line comprising two longitudinal conveyor elements parallel to each other that are respectively able to drive said at least two parts of each support at speeds of longitudinal forward movement different from each other in such a manner as to cause rotation of the object about the non-horizontal axis and to convert on its stalk the predetermined geometric orientation.

8. The system as claimed in claim 7, wherein each support carrying an object is formed by two elongate support elements each disposed transversely relative to the longitudinal forward direction, one behind the other and conjointly conformed to receive the object to be carried.

9. The system as claimed in claim 8, wherein each transverse elongate support element comprises two portions disposed alongside one another in accordance with the transverse arrangement of said element relative to the longitudinal forward direction, each of the two portions being mobile in rotation independently of one another.

10. The system as claimed in claim 9, wherein each transverse elongate support element has a general shape of revolution about the longitudinal axis of said element.

11. The system as claimed in claim 7, wherein each longitudinal conveyor element is chosen from a conveyor belt, a chain, and a belt.

12. The system as claimed in claim 6, wherein said system includes a contactless system for sorting the objects carried by the supports.

13. The system as claimed in claim 6, wherein system includes a system for transformation of the objects carried by the supports.

* * * * *